United States Patent [19]

Lockery

[11] Patent Number: 4,506,746
[45] Date of Patent: Mar. 26, 1985

[54] GAGED PLATE TRANSDUCER WEIGHING APPARATUS

[75] Inventor: Harry E. Lockery, Sudbury, Mass.

[73] Assignee: Hottinger Baldwin Measurements, Inc., Framingham, Mass.

[21] Appl. No.: 424,485

[22] Filed: Sep. 27, 1982

[51] Int. Cl.³ .......................... G01G 3/14; G01G 3/08
[52] U.S. Cl. ...................................... 177/211; 177/229
[58] Field of Search ................................. 177/211, 229

[56] References Cited

U.S. PATENT DOCUMENTS

| 4,261,429 | 4/1981 | Lockery | 177/211 |
| 4,396,079 | 8/1983 | Brendel | 177/211 X |
| 4,411,327 | 10/1983 | Lockery et al. | 177/211 |

Primary Examiner—George H. Miller, Jr.
Attorney, Agent, or Firm—W. G. Fasse; D. H. Kane, Jr.

[57] ABSTRACT

A platform for a scale is formed by elongate elements rigidly interconnected to provide a platform frame structure having, for example, an H-configuration. The strain gage transducer beams are formed integrally at each end of the elongate elements. Vertical load components are introduced into the transducer beams by suitably locating support feet under the platform frame structure so that the beams may properly flex. Load transfer from an upper platform to the transducer beams is preferably accomplished by ball and socket loading devices provided at each end of the elongate elements forming the frame structure.

14 Claims, 13 Drawing Figures

GAGED PLATE TRANSDUCER WEIGHING APPARATUS

CROSS-REFERENCE TO RELATED PATENTS AND APPLICATIONS

The present disclosure is related to U.S. Pat. No. 4,261,429, issued Apr. 14, 1981, for "Unitized Weighing Apparatus And Method For Making Such An Apparatus", and to U.S. patent application Ser. No. 263,505, filed on May 14, 1981 for "Apparatus For Applying A Load To A Strain Gage Transducer Beam" now U.S. Pat. No. 4,411,327.

BACKGROUND OF THE INVENTION

The present invention relates to improvements in strain gage weighing devices and in particular, to gaged plate transducers characterized by lightweight construction, yet having an increased stability and reliability for use in platform type scales.

U.S. Pat. No. 4,261,429 discloses a platform for a scale in which strain gage transducer beam elements are formed as integral components of the platform. Each strain gage transducer beam is formed in the platform with a flexural free end and a fixed end or root end merging into the plate as part of the platform structure. Strain gages are secured to these flexural transducer beams. Such a platform constructed with strain gage transducer beams as an integral part of the platform are referred to herein as "gaged plate transducers" or simply as gaged plates.

According to the method of preparing gaged plate transducers set forth in U.S. Pat. No. 4,261,429, holes are drilled in the platform in groups of four holes each. A plurality of slots are then machined or otherwise formed into the platform from the side so that the slots extend inwardly from the edges of the platform. Two slots extend in parallel to each other, each joining two holes in order to form a beam structure. Of the four holes one hole is drilled at the fixed end of each slot while the other hole is drilled intermediate the fixed end and the free end of each strain gage transducer beam. All strain gage elements bonded to the beam structures are electrically interconnected to form bridge circuits to provide a weight readout for the scale.

Such gaged plate transducer structures or platforms are incorporated in the weighing apparatus of U.S. Pat. No. 4,411,327 referred to above. Said patent application describes weighing scales with features for minimizing weighing errors due to the effects of horizontal loads temporarily applied to the platform scale. The scales of U.S. Pat. No. 4,411,327 comprise coupling means for transferring vertical load components to the strain gage transducer beams while substantially reducing or preventing the introduction of transverse or lateral load components to the strain gage transducer beams integrally formed in the platform.

According to the apparatus described in U.S. Pat. No. 4,411,327, two parallel horizontal platforms are coupled together in the weighing apparatus. A load is placed on the upper horizontal platform. The strain gage transducer beams are integrally formed in the lower horizontal platform. Force transmitting bars or brackets are secured to the strain gage transducer beams in the lower platform for transferring a vertical load from the upper platform to the respective flexural strain gage transducer beams through a "ball and socket" coupling in which a hardened ball bears against a concave or curved surface of larger radius of curvature than the radius of the ball. Such a coupling of first and second curved surfaces transmits vertical force components from the upper horizontal platform to the strain gage transducer beams while yielding to and substantially preventing the transmission of horizontal force components between the upper and lower horizontal platforms.

The coupling formed by two curved bearing surfaces of different radius of curvature such as a ball and socket coupling is, according to the above disclosure, enclosed in a flexible sleeve of rubber or similar material. The sleeve is preferably secured at its ends to provide a restoring force which dampens lateral oscillations and protects the coupling from contaminations.

U.S. Pat. No. 4,411,327 discloses yet another type of coupling for transmitting vertical force components from the upper horizontal member to the strain gage transducer beams by means of a laterally flexible suspension, such as a cable suspension. Such cable suspensions substantially prevent the transmission of horizontal force components between the upper and lower horizontal platforms.

Gaged plate transducer weighing platforms have many advantages, especially in their low profile, ease of manufacture and accuracy. However, a solid platform has a certain weight and corresponding material cost. The weight and cost factor increases with the weighing range. For example, the single piece gaged plate transducer plate for a scale with a weighing range of one thousand pounds requires an aluminum plate having dimensions of 30×30×0.5 inches which weighs about 45 pounds and costs over 70 dollars. Furthermore, scales fabricated in accordance with teachings of U.S. Pat. No. 4,261,429 or U.S. Pat. No. 4,411,327 if not constructed properly may be susceptible to torsional force components which may distort proper weight readings.

OBJECTS OF THE INVENTION

In view of the above it is the aim of the invention to achieve the following objects singly or in combination:

to reduce the quantity of material required in gaged plate transducer platforms and thereby reduce the weight and cost of manufacture without sacrificing performance in any manner;

to provide improved gaged plate transducer platform type scales with integrally formed strain gage transducer beams or scales with lightweight, fabricated structures which are less susceptible to torsional forces; and to increase the stability and reliability of gaged plate transducer platform type scales and of scales with fabricated frame structures and integral transducer beams.

SUMMARY OF THE INVENTION

In order to accomplish these objectives the present invention provides an improved strain gage weighing apparatus in which the operative horizontal member having strain gage transducer beams as integral components, comprises at least two elongate elements integrally joined to form a rigid frame. The strain gage transducer beams are integrally formed in the two elongate elements adjacent each end thereof.

According to the invention the fabricated frame structure may assume a variety of configurations. For example, the horizontal member or frame may comprise first and second elongate elements such as standard bar stock arranged substantially in a common plane in a spaced apart configuration with at least a third elongate connector element joining the first and second elongate element. Thus, the invention contemplates eliminating those portions of the plate or platform which are unnecessary for structural strength or operative purposes.

Such a frame platform may include additional cross bracing elements, or it may have the configuration of an X or other intersecting cross-over configuration.

Whatever the configuration, the elongate elements are arranged to define peripheral edges or ends at the corners of the frame platform in which the integral transducer beams may be formed in the manner described, for example in the above U.S. Pat. No. 4,261,429.

The invention also contemplates as a stabilizing feature forming the integral transducer beam structures adjacent the ends of the elongate elements, but wholly within the perimeter of the elongate frame element, leaving a stationary or "dead" or free space between the end of the transducer beam and the end of the elongate element. By this expedient, the ground engaging and stabilizing feet of the platform frame may be fixed to the elongate elements in the "dead" space outside the flexural transducer beams, thereby affording greater stability for the platform scale.

When forming such integral strain gage transducer beams in the elongate frame elements of the frame structure inside the peripheral edges, six holes may be drilled in the elongate element spaced from the end. The six holes are formed in two rows and two elongate slots join the holes of each row. A cross slot is then cut or otherwise formed in the element at one end of the two rows of holes, thereby forming the free flexural end of the integral transducer beam, which free end may point radially inwardly or outwardly relative to the geometrical center of the frame structure. The other fixed or root end of the sensing or transducer beam merges integrally into the elongate element and faces in the respective opposite direction.

A frame structure constructed according to the invention may be incorporated in platform type weighing scales, for example, described in the above mentioned U.S. Pat. No. 4,261,429 or in U.S. Pat. No. 4,411,327. In the former case the present low weight platform may serve at the load supporting member or as the platform which carries the strain gage transducer beams, all as fully set forth in said U.S. Pat. No. 4,261,429.

Constructing the gaged plate transducer carrying frame structure from standard bar stock as taught herein provides a stable scale platform and it also reduces torsional loads which might otherwise be transmitted to the strain gage transducer beams. The greater stability is achieved by a number of expedients, for example by setting the strain gage transducer beams inside the perimeter of the elongate elements with the feet located outside the transducer or sensor beams. The reduction of torsional loads or forces is also obtained through judicious placement of the supporting feet.

BRIEF FIGURE DESCRIPTION

In order that the invention may be clearly understood, it will now be described, by way of example, with reference to the accompanying drawings, wherein:

FIG. 1 is a perspective view of the prior art gaged plate transducer platform of U.S. Pat. No. 4,261,429;

DETAILED DESCRIPTION OF PREFERRED EXAMPLE EMBODIMENTS AND OF THE BEST MODE OF THE INVENTION

Figure 1:
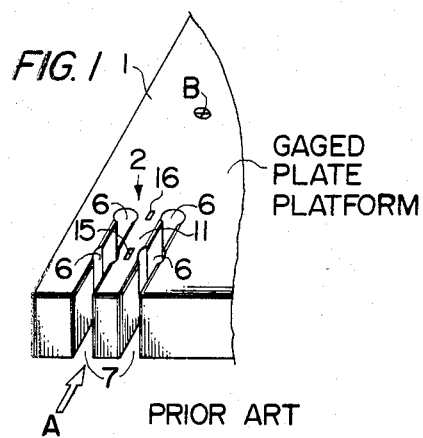

FIG. 1 shows a prior art gaged plate transducer platform 1 as disclosed in U.S. Pat. No. 4,261,429. The platform 1 is made of metal, for example, aluminum alloy suitable for this purpose. A suitable thickness for the platform 1 is, for example 0.18 to 0.5 inches for a load range of from 30 to about 2000 pounds. Alloy steel or stainless steel full plates may be used for scales of higher load range. Four groups of holes 6 are drilled entirely through the platform 1. The location of the hole groups relative to the platform may differ. Typically, as in FIG. 1, the holes of a group are located substantially near a corner of the platform 1.

A pair of slots 7 is cut into the platform at each group of holes 6, for example by sawing, machining or otherwise cutting, so that each slot extends from an edge of the platform inwardly to connect two holes with the edge to form a strain gage transducer beam 11 integrally as part of the platform structure. Strain gage elements 15 and 16 are secured conventionally, for example, by means of adhesive to the beam 11. Preferably these strain gage sensing elements are located between the holes 6.

The hole diameters and spacings and the thickness of the platform, will depend on the required scale load range or capacity. These dimensions are also selected with due regard to the scale sensitivity. According to the present invention as, for example, illustrated in FIG.

Figure 2:
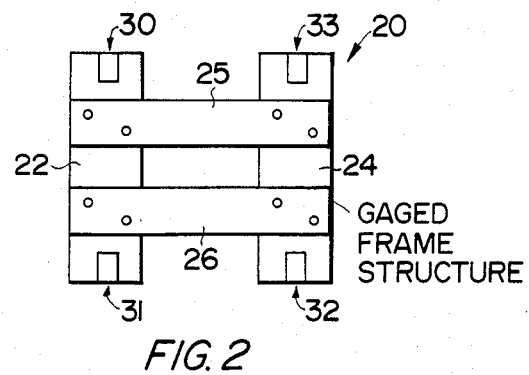
FIG. 2 is a plan view of a modified panelized gaged plate transducer frame structure in accordance with the present invention.

2, a different approach is taken to making the platform. According to the present invention a single sheet or plate of material is not used for making the platform. Rather, the platform is made as a frame structure for reduction in material cost and weight. As shown in FIG. 2, the "platform" 20 comprises a frame structure made of elongated elements 22 and 24 lying in a common plane in a spaced apart parallel orientation. These elongate elements 22 and 24 may be fabricated of the same metal material and with the same thickness and length as described with reference to the platform 1 of FIG. 1. Standard bar stock may also be suitable for making these elongate frame elements 22, 24. The frame elements 22 and 24 are joined to form a rigid frame structure by third and fourth elongate connecting elements 25 and 26. The interconnection may be accomplished by conventional means such as rivets, welding, nuts and bolts or the like.

In order to provide a gaged plate transducer platform 20 strain gage transducer beams are integrally formed in the ends of elements 22 and 24 at each end. The strain gage transducer beams 30, 31, 32 and 33 are formed in the respective ends of the elements 22 and 24 in the same manner as described above with reference to FIG. 1.

Figure 3:
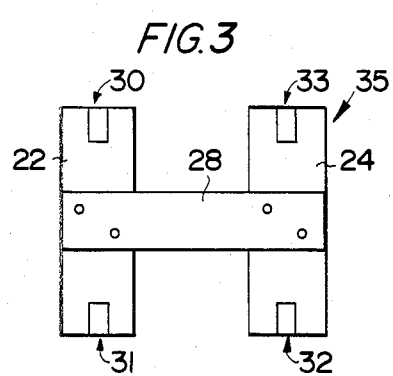
FIG. 3 is a plan view of another gaged plate transducer frame structure according to the present invention.

For a lower load range the frame may have the shape illustrated in FIG. 3. In this arrangement the parallel spaced apart elongate frame elements 22 and 24 are joined into a rigid structure by only a single connecting cross element 28 thereby forming an H-configuration. In other respects, the platform 35 of FIG. 3 is the same as platform 20 of FIG. 2 and corresponding reference numerals are therefore used for the same items.

Figure 4:
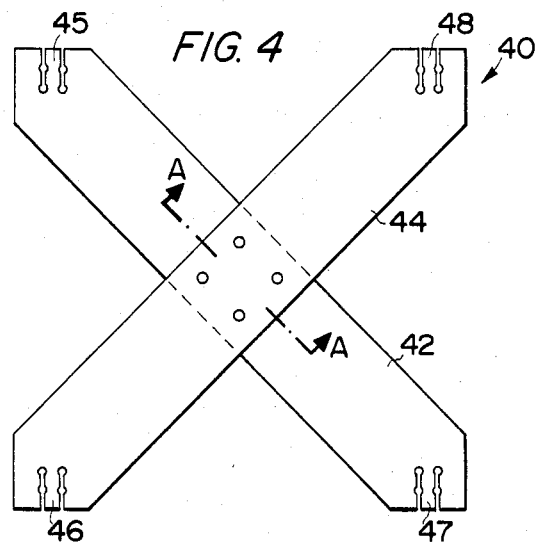
FIG. 4 is a plan view of yet another gaged plate transducer frame structure comprising elongated elements arranged in an intersecting cross-over configuration.
Figure 4A:
FIG. 4A is a fragmentary cross-section in the direction of the arrows on line A—A of FIG. 4 showing the recesses which permit the intersecting elongate elements to lie substantially in a common plane.

Yet another platform member 40 having an "x" or "cross" configuration is illustrated in FIG. 4. In this arrangement elongate frame elements 42 and 44 are joined at the cross-over intersection in a rigid structure. As shown in FIG. 4a the elongate elements 42 and 44 are formed with recesses in the area of the intersection for interfitting so that the down facing surface of the elements 42 and 44 lie in a common plane.

The strain gage transducer beams 45, 46, 47 and 48 are formed in the outward ends at opposite corners of elongate elements 42 and 44, in the same manner as described above with reference to FIG. 1 and strain gages are bonded to the beams also in the same manner.

A 1000 pound load capacity platform scale can be fabricated using a gaged plate transducer platform of the type shown in FIG. 2, thereby reducing the weight of the platform by 60 to 70%, as compared to the weight of the prior art configuration of FIG. 1. Hence, a substantial reduction in material costs is achieved. Tests of a 1000 pound load capacity platform scale with the platform 20 of FIG. 2 indicate a performance fully equivalent to the single piece gaged plate of FIG. 1. A 150 pound load capacity platform scale using the platform frame configuration 35 of FIG. 3 was also assembled and tested and found to be equivalent in performance to a 150 pound load capacity single piece gaged plate configuration of the type illustrated in FIG. 1.

In converting to the frame structures of the invention for replacing the single piece platforms, attention must be paid to the stability of the frame structure and to avoiding any inadvertent or undesirable torsional forces that otherwise might be transmitted to the strain gage transducer beams forming integral parts of the frame structure thereby distorting the weight readings. Thus, according to the invention the support feet for the platform are placed in special locations under the platform, as will be described below.

In U.S. Pat. No. 4,261,429, the support feet are located inboard from the flexural or free end of the strain gage transducer beam in the platform. This is all right for scales of larger dimensions, but with feet located inboard on scales of smaller dimensions, tipping of the scale can occur if the measured weight is placed close to the side edge. This invention avoids such tipping by preferably placing the feet as closely as possible to the edge of the frame as shown in FIG. 5.

Figure 5:
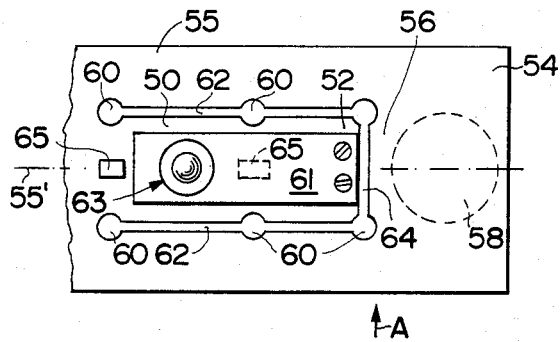
FIG. 5 is a fragmentary top plan view of the end of an elongate element for the gaged frame structure showing one arrangement of the integral strain gage transducer beam and supporting foot.
Figure 5A:
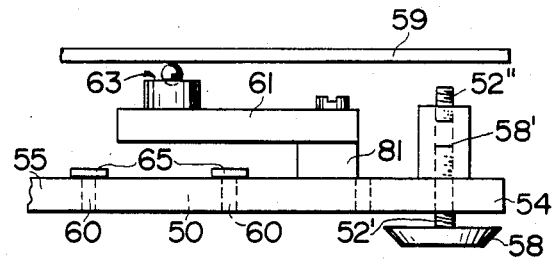
FIG. 5A is a side view in the direction of the arrow A in FIG. 5.

According to the embodiment of FIGS. 5 and 5A the sensing beam 50 is integrally formed in the end of an elongate frame element 55 such that the free end or flexural end 52 of the transducer beam 50 is spaced from the end 54 of the elongate frame element 55. This spacing defines a non-flexural "dead" frame element area 56 between the transducer beam 50 and the end of 54 of the elongate frame element 55. According to the invention the foot means 58 is secured to the free end 54 of the frame element 55 by an adjustable screw 52' in a threaded bushing 58' the non-flexing frame element area 56. The screw 52' works as and adjustment of the foot 58 for leveling the scale. A set screw 52" in the same bushing 58' works as an adjustable overload stop whereby an overload is applied directly to the foot. A feature and advantage of this arrangement is that the leveling feet 58 are positioned outboard of the transducer beam 50 and as close to the edge of the gaged frame structure as possible thereby avoiding tipping over of the frame structure. An additional feature or advantage lies in placement of the feet along the central length axis 55' of the elongate members 55, thereby eliminating torsional forces on the elongate elements 55, since the force applied to each beam 50 is also effective centrally to the respective member 55 because the beams 50 are located centrally and symmetrically in the elements 55. Another feature lies in the fact that the foot is now completely isolated "stresswise" from the strain gages 65, such that contact stresses under the foot are not reflected into and sensed by the strain gages 65.

Figure 6:
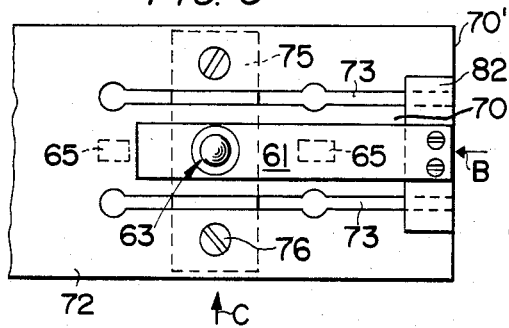
FIG. 6 is a fragmentary top plan view of the end of another elongate element showing another configuration for the strain gage transducer beam and supporting foot.

In forming an integral sensing beam of the type illustrated in FIGS. 5 and 5A, a group of six holes 60 is drilled entirely through the elongate element 55 in two rows. Two elongate slots 62 are milled, cut or otherwise formed through the panel joining the rows of holes 60. Additionally, a cross-slot 64 is cut at one end. The cross-slot may be placed at either end. As shown, the integral transducer beam 50 is oriented in the direction of the central length axis of the element 55 with the free flexural end 52 of the beam 50 oriented in the direction of the nearest end 54 also referred to as the outboard end, while the root end merging into the element 55 is oriented in the direction of the geometrical center of the element 55. Strain gages 65 are bonded to the beam between pairs of holes 60 as shown in FIGS. 5 and 6 to have a spacing between two strain gages 65 on a beam 50 or 70. The adjustment screw 52' extends through a threaded stud 58'. The load on a top platform 59 is applied to the beam 50 through a loading bracket 61 secured to the free end of the beam 50 by a screw and spacer. Preferably a ball and socket means 63 is operatively interposed between the loading bracket 61 and the top platform 59 and centrally above said spacing, so that the point of load application is located centrally in said spacing.

Figure 6A:
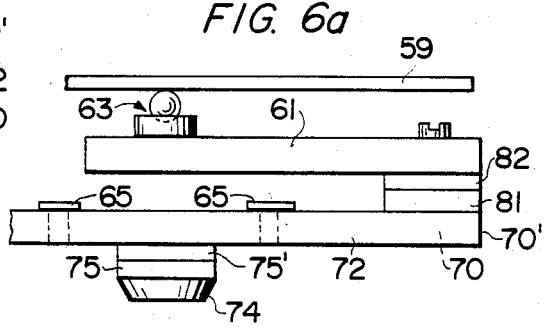
FIG. 6A is a side view of the elongate element of FIG. 6 in the direction of the arrow C in FIG. 6.
Figure 6B:
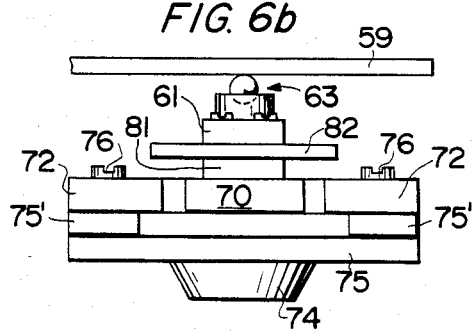
FIG. 6B is an end view of the elongate element in FIG. 6 in the direction of the arrow B.

Yet another configuration for the sensing beam and support feet is shown by way of example in FIGS. 6, 6A and 6B wherein the strain gage transducer beam 70 is formed in the end of an elongate frame element 72 in the same manner as described above, except that the slots 73 reach to the edge 70'. In this example, the support foot 74 is mounted to the bottom of a bridge member 75 which bridges the transducer beam 70 in the elongate element 72 from one connecting means 76 to the other. By means of this bridge member 75 the feet 74 are placed directly under and centrally and symmetrically to the point of load application and in vertical register therewith. This feature has the important advantage that undesirable loads or moments are not applied to the scale because torsional forces in both directions, along and transverse to the elongate member 72 are eliminated. This is particularly the case when the gaged frame structure employs the ball and socket type of loading as described in more detail in U.S. Pat. No. 4,411,327.

Incidentally, the platform 59 is not shown in FIGS. 5 and 6. The loading of the sensing beam 70 in FIGS. 6, 6A and 6B is the same as in FIGS. 5, 5A. The loading bracket 61 is secured through a spacer 81 to the free end of the beam 70. If desired an overload stop 82 may be used at the free end of the beam 70 whereby the overload stop 82 cooperates with the surface of the element 72 opposite said bridge member 75 as shown in FIGS. 6a and 6b. Spacers 75' are also inserted between the bridge member 75 and the portions of the element 72 outside the beam 70 to permit the flexing of the beam 70.

Figure 7:
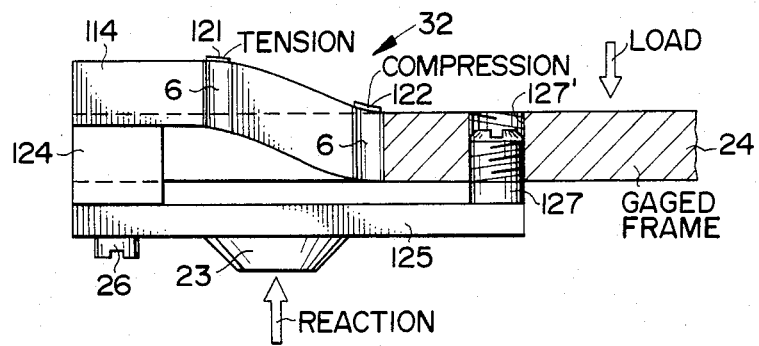
FIG. 7 is a detailed side view, partially in section, of the end of a gaged frame structure elongate element for applying the load to the integral transducer beam.

FIG. 7 shows a corner of a gaged frame structure which is incorporated in a scale of the type described in U.S. Pat. No. 4,261,429. The effect of the load which is applied, to the beam transducer 32 in present FIG. 7, is shown in an exaggerated manner. This is also the case in FIG. 5A. In the example of FIG. 7 the gaged frame structure 35 of FIG. 3 is shown in section at the end of the elongate frame element 24, whereby the strain gage transducer beam 32 is revealed in a flexed condition due to the load on the gaged frame structure. The strain gages 121 and 122 are subjected to tensile strain and compressive strain respectively. Under maximum load as here shown, the flexing of the strain gage beam 32 is limited by an overload limit stop 127 and two other overload stops not shown in FIG. 7, but located behind and in front of, relative to the plane of the drawing, the spacer 124.

In the example of FIG. 7, the foot 23 of rubber or other resilient material is secured to the free end 114 of the beam 32 through a spacer 124 and a loading bracket 125. A similar structure is arranged at each corner of the gaged frame structure forming a platform. The outer end of each loading bracket 125 is secured to the spacer 124 by a connecting element 126 such as a screw or the like. The inner end of each bracket 125 reaches sufficiently inwardly relative to the elongated element 24 for cooperation with an overload limit means 127 which may be an adjustable screw in a threaded hole 127'.

Figure 8:
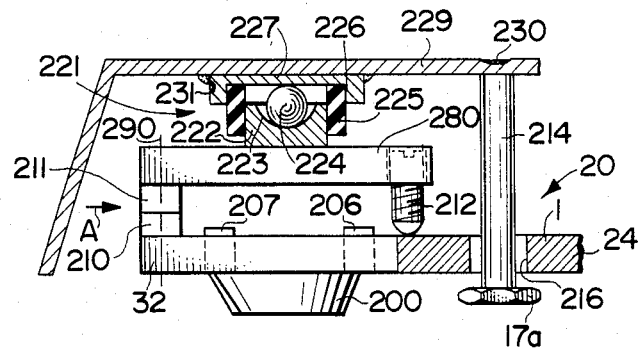
FIG. 8 is a detailed side view in partial cross-section, of another elongate element for a gaged frame structure including means for applying the load to the integral transducer beam of the elongate element.

FIG. 8 shows a fragmentary portion of the end of an elongate frame member in another type of suspension system for scale platforms. In this example the gaged frame structure 20 or 30 or 40 of the type illustrated in FIGS. 2, or 3, or 4 forms the lower horizontal member with a foot 200 mounted to the gaged frame structure element 24 as for example shown in FIG. 6A. The second platform 229 is the second horizontal member or upper platform to which the load is applied. A load placed on the upper platform 229 is transmitted to the lower frame platform 20 and in particular, to the strain gage beams 32 at the end of the platform frame elements 24 by a coupling means 221, including a force transmitting bracket 280 secured to the free end of the sensing beam or strain gage beam 32, for example, by a threaded bolt 290 passing through spacer shims 210, 211. An adjustable stop such as a set screw 212 is inserted into a threaded hole at the free end of the force transmitting bracket 280 and may bear against the upwardly facing surface of the frame element 24 of the platform 20 for restraining the flexing of the beam 32 under maximum load. Another overload stop at 32 is not shown, but it is located behind of or in front of the plane of the drawing.

Further aspects of the coupling means 221 for applying a vertical load to the platform 20 include a hardened steel socket 222 secured to the force transmitting bracket 280 above and approximately midway between the strain gages 206 and 207. The socket 222 has a calotte 223 forming a first curved surface having a given radius of curvature which is larger than the radius of curvature of the second curved surface formed by a hardened steel ball 224. The retaining means includes a flexible length of rubber tube or hose 225 for holding the steel ball 224 in position in the calotte 223. For this purpose a flexible rubber sleeve 225 is secured with its upper end in a holding member 226 facing downwardly from the upper platform 229. The flexible sleeve 225 may be secured in the holding member 226 by adhesive or the like. The holding member 226 may be welded as shown at 231 to the downwardly facing surface of the upper platform 229. The upper platform 229 on which the load is placed bears on the steel ball 224 through a hardened steel plate 227 which may form the bottom or rather the top of the holding member 226, and if necessary, through an additional shim not shown. The hardened steel plate 227 and the shim, if any, may be cemented in place.

The ball and socket coupling substantially prevents the transmission of horizontal forces or lateral force components to the lower platform 24. However, some restriction of relative horizontal movements is desirable. Such restriction is provided by the flexible hose element 225 which restrains or dampens small loads in the horizontal direction. A shoulder bolt 214 restrains larger horizontal loads once the bolt 214 bears against the surface of the respective bore 216 in elongate frame platform element 24. The construction for the coupling in this example is the same at each end of the elongate frame platform elements defining the corners of the platform 20. The shoulder bolt may also be arranged to protrude through a suitable hole or bore 216 placed in the cross member of the frame structure.

In a similar manner, a flexible cable suspension coupling as illustrated and described with reference to FIG. 7 in U.S. Pat. No. 4,411,327 may be used in combination with the present invention.

Thus, the present invention is applicable in both single and double platform scales. A variety of different types of couplings for transmitting load forces to the strain gage beam may be used in combination with the present invention.

Figure 4B:
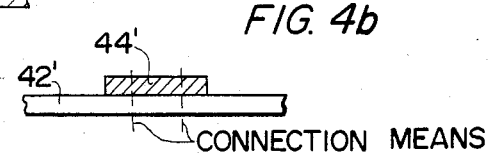
FIG. 4B shows a fragmentary side view illustrating a modification of FIG. 4A.

Incidentally, in FIG. 4B the two elongate frame elements 42' ad 44' may be secured to each other in any conventional manner in the cross-over zone without the need for placing both members in the same horizontal plane. Spacers not shown will be used at the ends of one of the elements 42' or 44' for compensating the elevational difference.

Any one of the load application examples may be used at each corner of the scale or rather at each end of the elongate elements forming the frame structure. With regard to the embodiments employing a ball and socket loading the flexible sleeve 225 shown in FIG. 8 may be omitted if desired. However, using such a flexible sleeve 225 has the advantage that a proper damping of any movements of the scale components relative to each other is achieved.

Although the invention has been described with reference to specific example embodiments it will be appreciated, that it is intended to cover all modifications and equivalents within the scope of the appended claims.

What is claimed is:

1. A strain gage weighing apparatus having upper and lower horizontal members arranged in substantially parallel planes relative to each other, said upper horizontal member comprising platform means for receiving a load to be weighed, said lower horizontal member comprising strain gage transducer beam means for measuring the weight of a load, load transfer means operatively arranged between said upper and lower horizontal members for transmitting vertical force components from the upper horizontal member to the strain gage transducer beam means while substantially preventing the transmission of horizontal force components between said upper and lower horizontal members, and foot means for stabilizing the weighing apparatus, said lower horizontal member comprising at least two elongate elements joined to form said lower horizontal member as a rigid frame structure, said strain gage transducer beam means being constructed as integral parts of said two elongate elements adjacent the ends thereof; said foot means being operatively arranged relative to the ends of said two elongate elements for applying a load representing force to each of the respective integral strain gage transducer beam means through said transfer means from the upper horizontal member to said strain gage transducer beam means, wherein said integral strain gage transducer beam means are spaced from the end of the respective elongate element, each of said transducer beam means having a root end merging into the respective elongate element in the direction of the center of said elongate element and a free end extending in the direction toward the outer end of said elongate element for flexural movement of the integral strain gage transducer beam means relative to said elongate element, said free end of the transducer beam means being spaced from the respective end of the respective elongate element (55) for defining a non-flexural frame element area (56) between the free flexural end (52) of the transducer beam means (50) and the end (54) of said elongate element (55), whereby said transducer beam means (50) is surrounded along all edges thereof by the respective elongate element (55), securing means for securing said foot means to said non-flexural frame element area (56) at the end of said elongate elements (55) outside of the respective transducer beam means (50), and wherein said load transfer means include a bracket between said upper member and the free flexural end (52) of the respective transducer beam means (50) for deforming the latter.

2. The weighing apparatus of claim 1, wherein said lower horizontal member comprises first and second elongate elements arranged in a common plane in a substantially parallel spaced apart configuration, said lower horizontal member further comprising at least a third elongate connector element integrally joining said first and second elongate elements to form said rigid frame structure (FIGS. 2 or 3).

3. The weighing apparatus of claim 1, wherein said lower horizontal member comprises first and second elongate elements arranged in a cross-over configuration, and means rigidly joining said first and second elongate elements at a cross-over area, (FIGS. 4, 4A, 4B).

4. The weighing apparatus of claim 1, wherein each of said integral transducer beam means is formed in the elongate elements by three slots, two of which are arranged in parallel to each other and a third slot interconnecting the parallel slots at one end thereof for defining the free end of the transducer beam means, and wherein holes are drilled into said elongate element along the slots at said free end, at said root end, and intermediate the free end and root end thereby providing a total of six holes, (FIG. 5).

5. The weighing apparatus of claim 1, wherein said securing means for said foot means comprise a threaded means with a threaded hole at each end, and an adjustment screw carrying said foot means at one end thereof and reaching with the other end thereof into one threaded hole of said threaded means, said adjustment screw being adjustable for leveling the weighing apparatus, said apparatus further comprising an adjustable set screw in the other threaded hole of the same threaded means for providing an overload stop, said threaded holes of said threaded means being in axial alignment with each other for introducing an overload directly into said foot means.

6. In a strain gage weighing apparatus including platform means, transducer beam means constructed as an integral part of said platform means, said transducer beam means having a flexural free end and a fixed root end merging into said platform means, strain gage sensor means operatively secured to said transducer beam means, and foot means operatively secured for permitting action on the free end of the respective beam transducer means, the improvement comprising at least two elongate elements arranged substantially in a common plane, means rigidly joining said elongate elements to form said platform means, wherein said strain gage sensor means carrying transducer beam means are integrally formed in said two elongate elements adjacent the ends thereof, and wherein said transducer beam means formed at each end of the two elongate elements are located inside the perimeter of the elongate elements, each side, except the flat sides, of each transducer beam means thereby being wholly enclosed by the respective elongate element.

7. The weighing apparatus of claim 6, wherein said platform means comprises first and second elongate elements arranged in a parallel spaced apart configuration and further comprising at least a third connecting elongate element integrally joining said first and second elongate elements to form a rigid structure.

8. The weighing apparatus of claim 6, wherein each of said transducer beam means comprises two slots formed in the elongate element adjacent the respective ends thereof, said two slots being arranged in a parallel configuration and a third slot interconnecting said two slots for defining said free end, each of said transducer beam means being further formed by holes drilled through said elongate elements at the free end, at the root end, and intermediate said free end and said root end.

9. The weighing apparatus of claim 8, wherein said third slot is located near the outer end of the elongate element so that said free end of said transducer beam means is oriented in the direction of the outer end of the elongate element, said root end being oriented in the direction toward the center of the respective elongate element.

10. The weighing apparatus of claim 6, said apparatus further comprising load transfer means for said beam means arranged for being operatively effective on said flexural free end of the beam transducer means through said load transfer means.

11. The weighing apparatus of claim 1 or 10, wherein said load transfer means comprise ball and socket elements operatively interposed between a load and said integrally constructed transducer beam means.

12. A strain gage weighing apparatus having upper and lower horizontal members arranged in substantially parallel planes relative to each other, said upper horizontal member comprising platform means for receiving a load to be weighed, said lower horizontal member comprising strain gage transducer beam means for measuring the weight of a load, load transfer means operatively arranged between said upper and lower horizontal members for transmitting vertical force components from the upper horizontal member to the strain gage transducer beam means while substantially preventing the transmission of horizontal force components between said upper and lower horizontal members, and foot means for stabilizing the weighing apparatus, said lower horizontal member comprising at least two elongate elements joined to form said lower horizontal member as a rigid frame structure, said strain gage transducer beam means being constructed as integral parts of said two elongate elements adjacent the ends thereof; said foot means being operatively arranged relative to the ends of said two elongate elements for applying a load representing force to each of the respective integral strain gage transducer beam means through said transfer means from the upper horizontal member to said strain gage transducer beam means, each of said strain gage transducer beam means comprising two strain gage elements operatively secured to the respective transducer beam means with a spacing between said two strain gage elements, and wherein each of said foot means comprises a bridging member (75), two spacers (75'), means (76) securing said bridging member (75) and said spacers (75') to the bottom side of the respective elongate element centrally across said spacing between the respective two strain gage elements for bridging the respective transducer beam means on the bottom side of said respective elongate element, said foot means comprising a ground engaging foot (74) secured to the bottom of the respective bridging member and in the center thereof, said load transfer means (63) being arranged centrally above said spacing, whereby said foot is located in vertical register with the respective one of said load transfer means and thus vertically under the point of load application.

13. The apparatus of claim 12, further comprising overload stop means (82) arranged for cooperation with a surface of said elongate element (72) opposite said bridging member.

14. The weighing apparatus of claim 12, wherein each of said transducer beam means is formed in the respective ends of the two elongate elements by slots cut to run in parallel to longitudinal sides of the respective elongate element, each of said transducer beam means further comprising holes drilled into said panel means substantially at the ends of said slots and intermediate the ends of said slots, (FIG. 6).

* * * * *